US007136813B2

(12) United States Patent
Likhachev et al.

(10) Patent No.: US 7,136,813 B2
(45) Date of Patent: Nov. 14, 2006

(54) PROBABALISTIC NETWORKS FOR DETECTING SIGNAL CONTENT

(75) Inventors: Maxim Likhachev, Atlanta, GA (US); Murat Eren, Belleville, NJ (US)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 09/963,177

(22) Filed: Sep. 25, 2001

(65) Prior Publication Data

US 2003/0061040 A1 Mar. 27, 2003

(51) Int. Cl.
*G10L 15/08* (2006.01)

(52) U.S. Cl. ........................................ 704/240

(58) Field of Classification Search ................ 704/201, 704/240

See application file for complete search history.

(56) References Cited

U.S. PATENT DOCUMENTS 4,227,177 A * 10/1980 Moshier ..................... 704/231
4,241,329 A * 12/1980 Bahler et al. ............... 704/231
5,337,251 A 8/1994 Pastor
5,570,556 A * 11/1996 Wagner ....................... 52/552
5,649,055 A * 7/1997 Gupta et al. ................ 704/233
5,970,441 A * 10/1999 Mekuria ..................... 704/207
6,161,089 A * 12/2000 Hardwick ................... 704/230
6,347,297 B1 2/2002 Asghar et al.
6,418,412 B1 7/2002 Asghar et al.
6,745,155 B1 * 6/2004 Andringa et al. ........... 702/189
2002/0038211 A1 3/2002 Rajan
2002/0165713 A1 * 11/2002 Skoglund et al. ........... 704/240

FOREIGN PATENT DOCUMENTS

EP 0 625 775 A1 11/1994
EP 0 683 482 A2 11/1995

OTHER PUBLICATIONS

PCT Search Report, Dec. 17, 2002.

* cited by examiner

*Primary Examiner*—Michael N. Opsasnick
(74) *Attorney, Agent, or Firm*—Alan L. Pedersen-Giles

(57) ABSTRACT

A method and apparatus using a probabilistic network to estimate probability values each representing a probability that at least part of a signal represents content, such as voice activity, and to combine the probability values into an overall probability value. The invention may conform itself to particular system and/or signal characteristics by using some probability estimates and discarding other probability estimates.

54 Claims, 11 Drawing Sheets

PROBABALISTIC NETWORKS FOR DETECTING SIGNAL CONTENT

The present invention relates generally to probabilistic networks, and in particular to implementations of probabilistic networks that detect signal content.

BACKGROUND

Analog signals and digital bit stream signals that carry content such as voice, picture, and facsimile patterns may use electric currents, electromagnetic radiation (radio and light waves), sound waves, and other transmission and storage means as carriers for the content. A telephone system, for example, may use numerous carriers in a single connection as a sender's voice signal travels through telephone lines, fiber optic cables, cell phone transmission antennae, and sound speakers. Regardless of the carrier, certain intervals of the signal may represent content, while other intervals or characteristics of the signal may represent nothing more than the presence of the carrier with no content included or superimposed. At times it is beneficial to separate the parts of a signal containing content from the parts of a signal lacking content.

Voice activity detection (VAD) and data compression are examples of techniques that depend upon separating the content part(s) of a signal from the non-content parts. Speakerphone and cell phone systems use VAD to switch signal transmission on and off depending on the presence of voice activity or the direction of speech flow. VAD may also be used in microphones and digital recorders for dictation and transcription, in noise suppression systems, as well as in speech synthesizers, speech-enabled applications, and speech recognition products. VAD may be used to save data storage space and transmission bandwidth by preventing the recording and transmission of undesirable signals or digital bit streams that do not contain voice activity.

VAD usually relies on measurements of one or more attributes of a signal to estimate when voice activity is present in an interval of the signal. For example, the energy level is an attribute of a signal that may be measured using the root mean square voltage levels of the signal to estimate which intervals of the signal contain voice activity. The same energy level measurements may be used in different ways to estimate the presence of voice activity. U.S. Pat. No. 6,249,757 to Cason, for example, is directed to a VAD system that uses two signal filters to provide the difference between a noise floor and the total energy in a communications signal. The signal is partitioned into frames for spectral analysis. Voice activity is detected if the difference between the noise floor and the total energy exceeds a threshold. U.S. Pat. No. 6,023,674 to Mekuria is directed to a periodicity detector that extracts pitch frequencies from a signal and determines speech pitch tracks using a non-linear signal processing block.

There are numerous ways to estimate the presence of voice activity in a signal using measurements of the energy and/or other attributes of the signal. Energy level estimation, zero-crossing estimation, and echo canceling are known methods to estimate or to assist in estimating the presence of voice activity in a signal. Tone analysis by a tone detection mechanism (DTMF) may be used to assist in estimating the presence of voice activity by ruling out DTMF tones that create false VAD detections. Signal slope analysis, signal mean variance analysis, correlation coefficient analysis, pure spectral analysis, and other methods may also be used to estimate voice activity. Each VAD method has disadvantages for detecting voice activity depending on the application in which it is implemented and the signal being processed.

Data compression is another technique that relies upon detection of signal content. Data compression is increasingly used to minimize the number of bits needed to store or transmit digital data. For example, JPEG and MPEG standards for the digital representation of images and movies allow a wide variety of data compression schemes to represent empty or repetitive parts of a picture with a compact marker. This typically saves a large percentage of the storage space or transmission bandwidth that an uncompressed image would have required.

Although detecting intervals of voice activity in a carrier signal using VAD and detecting compressible parts of a signal for data compression, such as Silence Compressed Record, are two examples of applications that use signal content detection, there are many other applications in which the present invention could be used, for example distinguishing communication patterns in random radio waves, searching for patterns in random data, and synchronizing communication between computing devices.

DETAILED DESCRIPTION OF THE INVENTION

Figure 1:
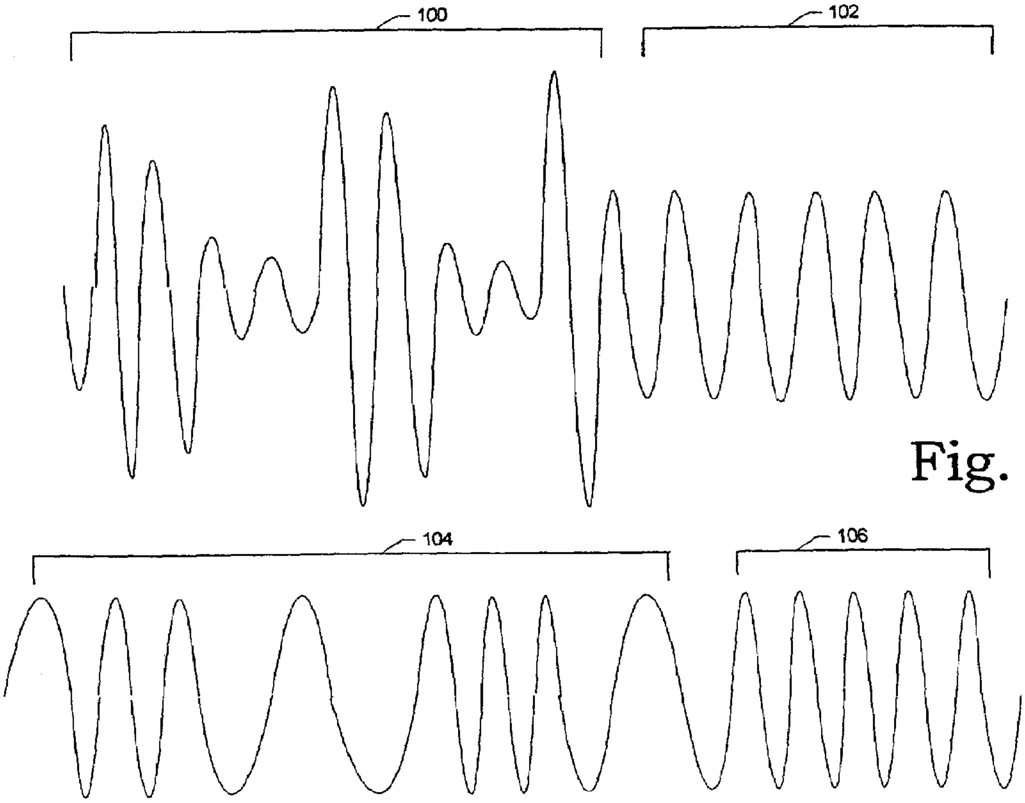
FIG. 1 is a graphical representation of analog signals containing intervals of content.

What is described herein is a method and apparatus for detecting intervals of signal content using probabilistic networks that may be configured in run-time.

In accordance with one aspect of the invention, probabilistic networks include Bayes belief networks. Bayesian networks represent probabilistic relationships between states in a subpart of a system. States can change and are therefore called either nodes or variables. A belief network may be pictured as an acyclic directed graph where the variables are nodes in the graph connected by lines or arcs representing the relationships between the variables. Associated with each variable in a belief network is a set of probability distributions. Using conditional probability notation, the set of probability distributions for a variable, "x," can be denoted by p(x|Π), where "p" refers to the probability distribution and "Π" denotes one or more immediate predecessors or "parents" of variable x. The parent(s) are any other variables connected to variable x that exert an influence on the probability states of x. The expression p(x|Π) reads as follows: "the probability distribution for variable x given Π, the immediate predecessor(s) of x."

The probability distributions specify the strength of the relationships between variables. For example, if Π is the parent of x and Π has two states (e.g., true and false) then associated with Π is a single probability distribution p(Π|Ø) and associated with x are two probability distributions $p(x|\Pi_{TRUE})$ and $p(x|\Pi_{FALSE})$. Probability distributions may either be prior or posterior. A prior probability distribution refers to the probability distribution before new data is input to the network while a posterior probability distribution refers to the probability distribution after new data is input.

Decision theory and probabilistic inference may be implemented in applications, such as methods and devices for VAD and data compression. Variations of probabilistic Bayes belief networks ("networks") may be employed as decision-making tools. A network can provide intuitive inference for computing the probability distributions of a set of variables in the network, given evidence of other related variables in the network. In a practical method or device having numerous parts (steps, states, and/or modules), a network may be employed to describe probabilistic relationships between the parts, and make decisions about one or more parts using probabilistic inferences about the behavior, state, and/or input from the other parts.

The present invention uses a probabilistic network to detect, decide, and/or estimate ("detect") whether content is present in at least part of a signal. Content is any data, pattern, subjectively meaningful signal attribute(s), and/or subjectively meaningful signal characteristic(s) carried by, included in, or superimposed upon an interval, attribute, and/or characteristic (collectively "part") of a signal or carrier ("signal").

Multiple methods and/or modules ("estimators") for detecting signal content may be combined into a probabilistic network. The network can be adjusted, even during run-time, to enable and/or disable estimators. Thus, the network may be used to improve content detection techniques, such as VAD and data compression, by enabling only a certain number of estimators and probabilistically combining them to give a more precise detection of the presence of content than any single estimator or fixed set of estimators. Alternately, the present invention may improve content detection by enabling all estimators, but selecting only some probability values from the estimators for use in the network and discarding other probability values. The network of the present invention may be configured manually during run-time or automatically conform itself to system and/or signal conditions by enabling some estimators and disabling others.

In addition to allowing a set number of estimators to be easily enabled or disabled during run-time to conform to the characteristics of a system and/or a signal, the network allows any number of new estimators to be added to the network. New estimators may include, for example, hardware plug-in modules, software modules, and/or algorithms that perform content detection. New estimators being added to the network may be improved versions of known content detection modules, or may be content detection methods and modules yet to be invented.

Estimators with a wide range of physical and functional characteristics are usable by the network of the present invention, as long as each estimator is able to estimate the presence of content in a signal and communicate the estimate to the network. Typically, an estimate may be a probability value. Some estimators may function like a switch having an "on" state corresponding to a 100% probability that content is present in a signal and an "off" state corresponding to a 0% probability. It should be noted that probabilities are commonly stated as values between the integers 0 and 1, with 0 equaling a 0% probability and 1 equaling a 100% probability. If an event has a probability of p, an inverse probability is the probability of nonoccurrence, stated as (1−p). For example, an event with a probability of occurrence value of 0.6 (60%) has an inverse probability value (probability of nonoccurrence) of 0.4 (40%).

In combining initial probability estimates from all enabled estimators using efficient probabilistic inference, the present invention produces a decision as to the presence or absence of content in a signal that is often more sophisticated than the mere averaging of initial probability estimates. The network may take into account one or more prior probabilities that parts of the signal being processed represent content.

The present invention has been employed within the framework of Automatic Speech Recognition and Silence Compression Record applications using Matlab, a computer programming environment language, and using versions of the C computer programming language. The present invention has also been implemented on the 56300 Motorola DSP chip.

FIG. 1 shows example radio signals carrying content. AM radio waves carry content 100 such as voice activity in the amplitude variations of the carrier waves. Intervals of content 100 may be separated by intervals lacking content 102. FM radio waves carry content 104 such as voice activity in frequency variations of the carrier waves. Intervals of content 104 may be separated by intervals lacking content 106.

Figure 2:
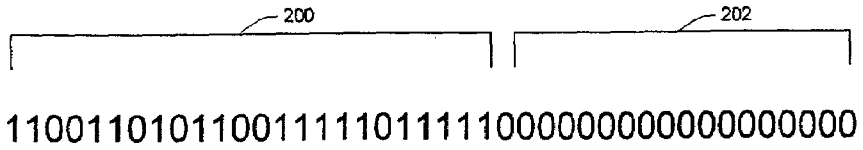
FIG. 2 is a graphical representation of a digital bit stream containing an interval of content.

FIG. 2 shows a digital bit stream in which content 200 is represented by the sequential ordering of high and low bits. Intervals lacking content 202 may intersperse intervals having content 200. Although FIGS. 1–2 show particular examples of signals carrying content, the present invention may be applied to any signal that carries content.

Figure 3:
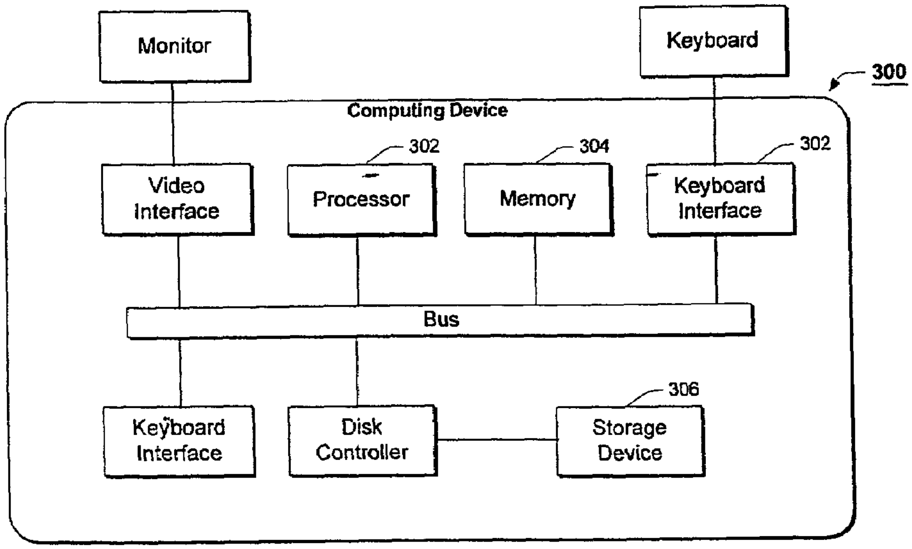
FIG. 3 is a block diagram of a computing device suitable for use with the present invention.

FIG. 3 shows a computer system suitable for practicing some embodiments of the present invention. The computer system 300 contains a processor 302, a memory 304, and a storage device 306. The processor 302 accesses data, including computer programs, on the storage device 306. In addition, the processor 302 transfers computer programs into the memory 304 and executes the programs once resident in the memory. A person having ordinary skill in the art will appreciate that a computer suitable for practicing the present invention may contain additional or different components. Other devices may also use the present invention, including cell phones, speakerphones, handheld personal digital assistants, and natural language processors.

Figure 4:
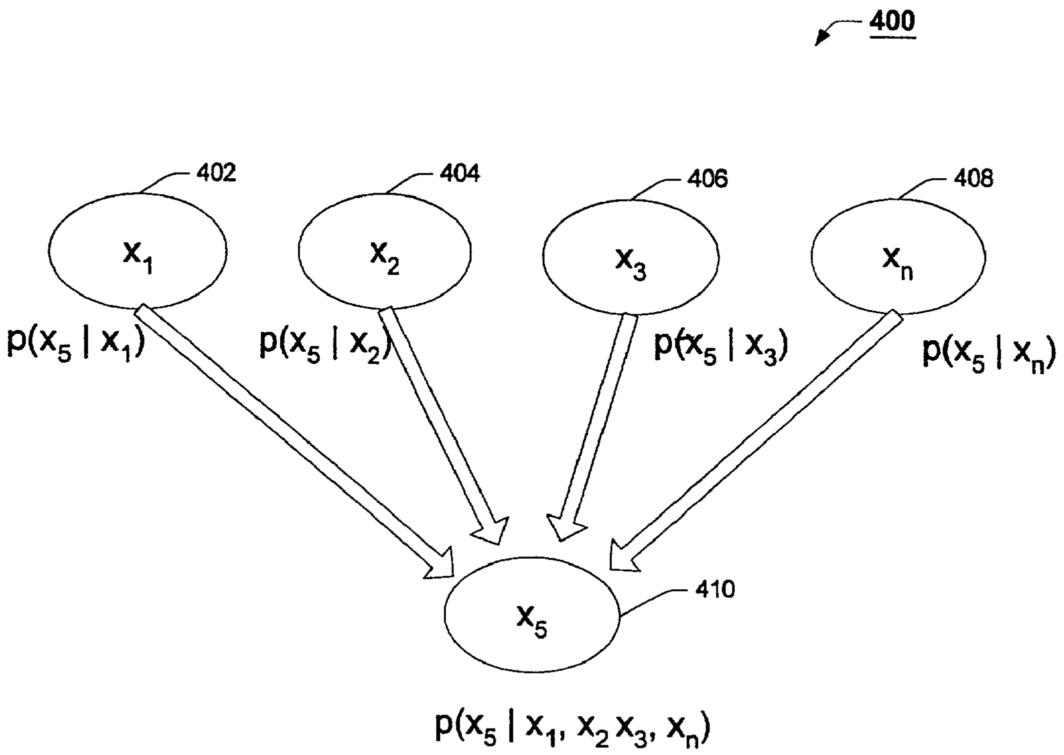
FIG. 4 is a graphical representation of a belief network.

FIG. 4 shows a singly connected Bayes belief network represented as a poly-tree 400 having variables "$x_1$" 402, "$x_2$" 404, "$x_3$" 406, "$x_n$" 408, and variable "$x_5$" 410. The network is called singly connected because variables $x_1$, $x_2$, $x_3$, and $x_n$ 402, 404, 406, 408 each have a single link to common variable $x_5$ 410, but do not have multiple links among themselves. A belief network represents a full joint probability distribution over n variables in the network. Therefore, the network allows the probability of any variable in the network to be obtained given evidence of the remaining variables. In other words, a query of any variable in the belief network can be calculated from the full joint probability.

The full joint probability distribution can be calculated by equation (1):

$$p(x_1, \ldots, x_n) = \prod_{i=1}^{n} p(x_i \mid \pi_i) \tag{1}$$

where $x_1, \ldots, x_n$ are n variables independent of each other given their corresponding priors $\pi_1, \ldots, \pi_n$ in the belief network; $\pi_i$ is the set of direct predecessors (parents) of $x_i$; and the term $p(x_i|\pi_i)$ is the conditional probability for variable $x_i$ if $\pi_i$ is not the empty set, otherwise it is the marginal probability of $x_i$. An overall probability value for variable $x_5$ 410 depends on the individual probability distributions at variables $x_1$, $x_2$, $x_3$, and $x_n$ 402, 404, 406, 408 since these variables are direct predecessors of variable $x_5$ 410 in the illustrated poly-tree 400. Individual probabilities of $x_5$ 410 given probability contributions from each individual predecessor variable considered separately are notated $p(x_5|x_1)$, $p(x_5|x_2)$, $p(x_5|x_3)$, and $p(x_5|x_n)$. The notation for querying the probability of variable $x_5$ 410 given joint probability of all the predecessor variables is $p(x_5|x_1, x_2, x_3, x_n)$.

Figure 5:
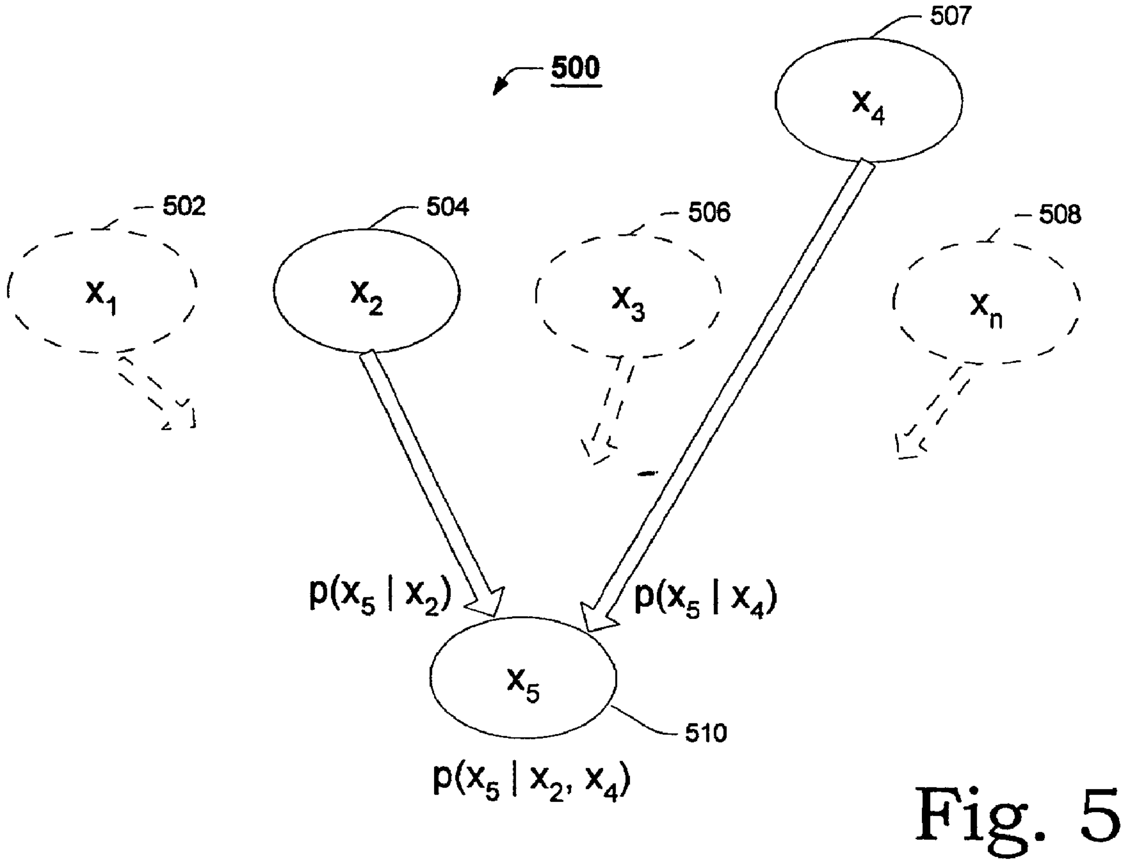
FIG. 5 is a graphical representation of the belief network of FIG. 4 having some variables removed from the network and one variable added to the network.

FIG. 5 shows a new query of a subset belief network 500 (illustrated as a poly-tree subset of the singly connected Bayes belief network of FIG. 4) with variables "$x_1$" 502, "$x_3$" 506, and "$x_n$" 508 marginalized (removed or disabled) from the query and new variable "$x_4$" 507 added to the query. It is possible to add and remove variables from a belief network in order to computationally consider only a subset and/or extension of the original network without altering the structure of the original network.

Probability distributions for variables in the new query can be obtained by first computing the full joint probability of the subset network 500. An overall probability value for variable $x_5$ 510 now depends on the individual probability distributions at variables $x_2$ and $x_4$ 504, 507 since these variables are direct predecessors of variable $x_5$ 510 in the illustrated poly-tree 500. Individual probability distributions for $x_5$ 510 given probability contributions from each individual predecessor variable are $p(x_5|x_2)$ and $p(x_5|x_4)$. The probability distribution for variable $x_5$ 510 in the subset belief network 500 given joint probability contributions from the enabled predecessor variables $x_2$ and $x_4$ is $p(x_5|x_2, x_4)$.

Figure 6:
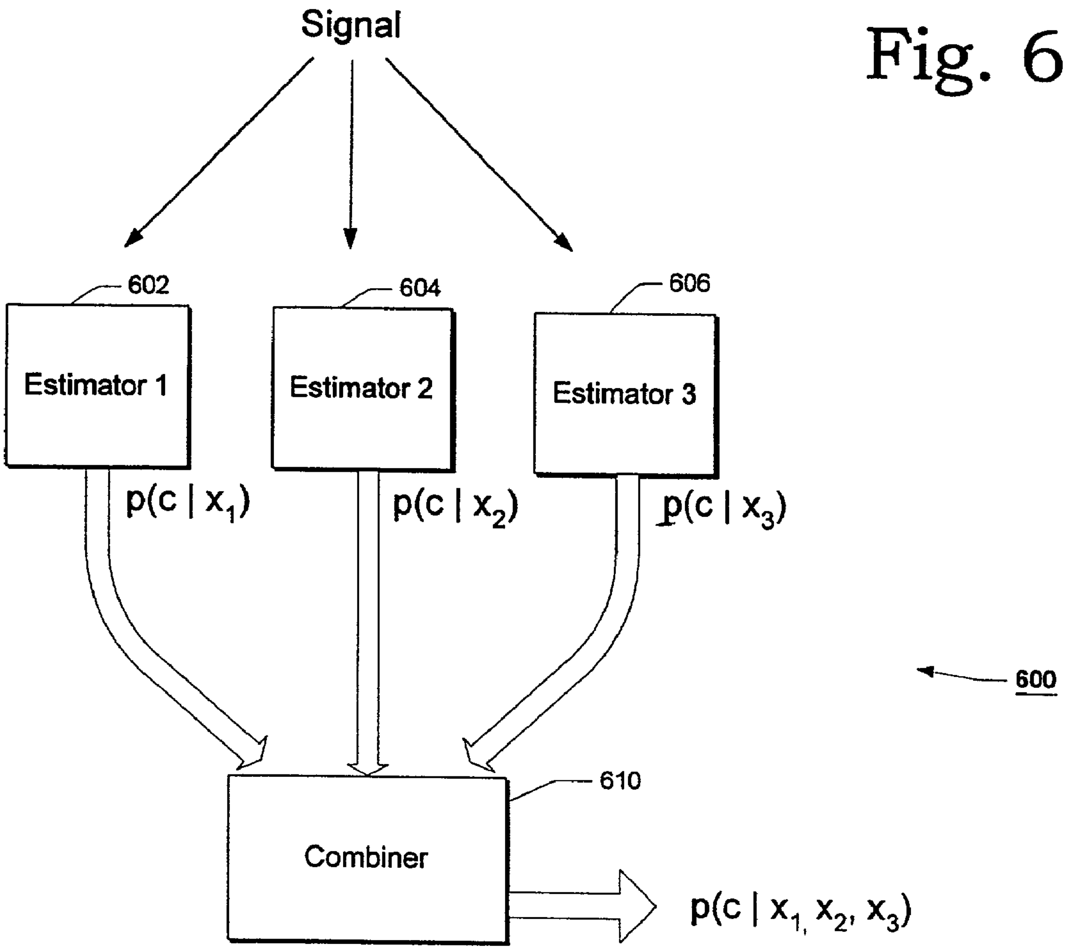
FIG. 6 is a block diagram of one apparatus embodiment of the present invention.

FIG. 6 shows one embodiment of the present invention in which estimators 602, 604, 606 are coupled to a combiner 610 in a probabilistic network 600. Generally, there can be n estimators, each estimating a probability of signal content based on their own measurements of one or more attributes of a signal. In this embodiment, the estimators 602, 604, 606 each estimate an initial probability that the part of the signal currently being measured represents content and may use any means available for obtaining initial probability estimates, including measuring one or more attributes of at least part of the signal. Although the illustrated embodiment 600 has three estimators, any number of estimators could be used, including one estimator. In one embodiment, the combiner 610 directly combines each initial probability value from each estimator into an overall probability value. In other embodiments, the combiner 610 may combine initial probability values only after each initial probability value is weighted by a prior probability factor. A prior probability factor may be a prior initial probability value from one or more estimators, or may represent a prior overall probability value from the combiner 610.

An overall probability value obtained by the network 600 may be compared with a pre-established or run-time established threshold value to decide whether the part of the signal being processed represents content. Alternately, an overall probability value could be used as input for another device, process, and/or probabilistic network.

In one embodiment, the network illustrated in FIG. 6 could obtain an overall probability value of signal content "c" using equation (2) under the assumption that $x_1, \ldots, x_n$ are independent of each other given the value of variable c:

$$p(c \mid x_1, \ldots, x_n) = \frac{\prod_{i=1}^{n} [p(c \mid xi)] * (1 - p(c))^{n-1}}{\prod_{i=1}^{n} [p(c \mid xi)] * (1 - p(c))^{n-1} + \prod_{i=1}^{n} [1 - p(c \mid xi)] * p(c)^{n-1}} \tag{2}$$

where n is the number of enabled units and p(c) is a prior overall probability value. In other words, p(c) is a probability of signal content when no other information is known. As discussed above, the overall probability of signal content $p(c|x_1, \ldots, x_n)$ may be compared to a threshold to decide whether a current interval of signal contains content. As modules are enabled or disabled, the value of n in equation (2) changes, but the equation may be coded to easily perform the changes in run-time. Alternately, equation (2) could be coded to always use the same number n of modules. A combiner 610 that uses equation (2) may, in one embodiment, combine initial probability values only from enabled estimators. Thus, for example, if estimator 1 602 is disabled or its data is simply unavailable, the conditional probability $p(c|x_1)$ can be set to 0.5, which automatically disables the contribution of estimator $x_1$ to the overall decision regarding whether content is present in part of the signal. A value of 0.5, representing neutral probability, cancels out the contribution of an estimator in equation (2). The network may conform itself to the characteristics of a particular system or a particular signal by using only data from enabled estimator (s), by using only available data (thereby ignoring estimators that do not have data available), and/or by actively enabling and disabling various estimators. Equation (2) allows for easy addition of new estimators, without altering the underlying probabilistic network 600. Moreover, the contribution of each estimator to the overall probability of signal content can be easily controlled by setting upper and lower bounds on the conditional probability $p(c|x_i)$ of the $i^{th}$ estimator. This is a more general approach, in which whenever an upper bound is equal to a lower bound and is equal to 0.5, the estimator is disabled, and whenever an upper bound is set to 1 and a lower bound is set to 0, then the estimator is completely enabled.

Figure 7:
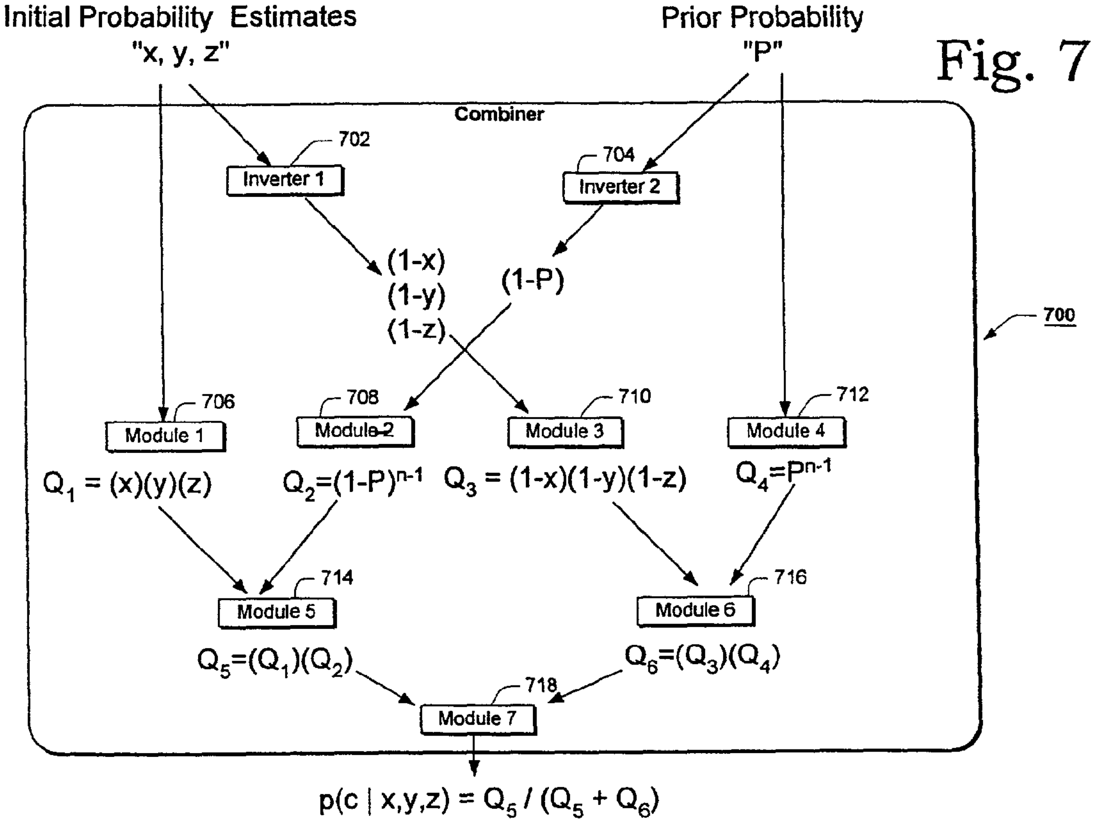
FIG. 7 is a block diagram of one combiner embodiment of the present invention.

FIG. 7 shows one embodiment of a novel combiner 700 of the present invention that combines initial probability values x, y, and z from estimators into a current overall probability value p(c|x, y, z) based in part upon at least one prior probability value, in accordance with equation (2). A prior overall probability value "P" may be used for the prior probability value. In this embodiment, a first inverter 702 obtains initial inverse probability values (1−x), (1−y), and (1−z) from the initial probability values x, y, and z directed to the combiner 700 from estimators. A second inverter 704 obtains an inverse (1−P) of the prior overall probability value P. A first module 706 obtains a first quantity $Q_1$ comprising the product of initial probability values. A second module 708 obtains a second quantity $Q_2$ comprising the prior inverse probability value raised to an exponent equaling a number of initial probability values. In this embodiment, the number of estimators minus one (n−1) is used for the exponent. A third module 710 obtains a third quantity $Q_3$ comprising the product of initial inverse probability values. A fourth module 712 obtains a fourth quantity $Q_4$ comprising the prior probability value raised to an exponent equaling a number of initial probability values. In this embodiment, the number of estimators minus one (n−1) is used for the exponent. A fifth module 714 multiplies the first quantity $Q_1$ by the second quantity $Q_2$ to obtain a fifth quantity $Q_5$. An sixth module 716 multiplies the third quantity $Q_3$ by the fourth quantity $Q_4$ to obtain a sixth quantity $Q_6$. A seventh module 718 obtains the overall probability value $p(c|x_1, \ldots, x_n)$ by dividing the fifth quantity $Q_5$ by the sum of the fifth quantity $Q_5$ and the sixth quantity $Q_6$.

Although the combiner 700 has been described in terms of "modules" to facilitate description, one or more circuits, components, registers, processors, software subroutines, or any combination thereof could be substituted for one, several, or all of the modules.

Figure 8:
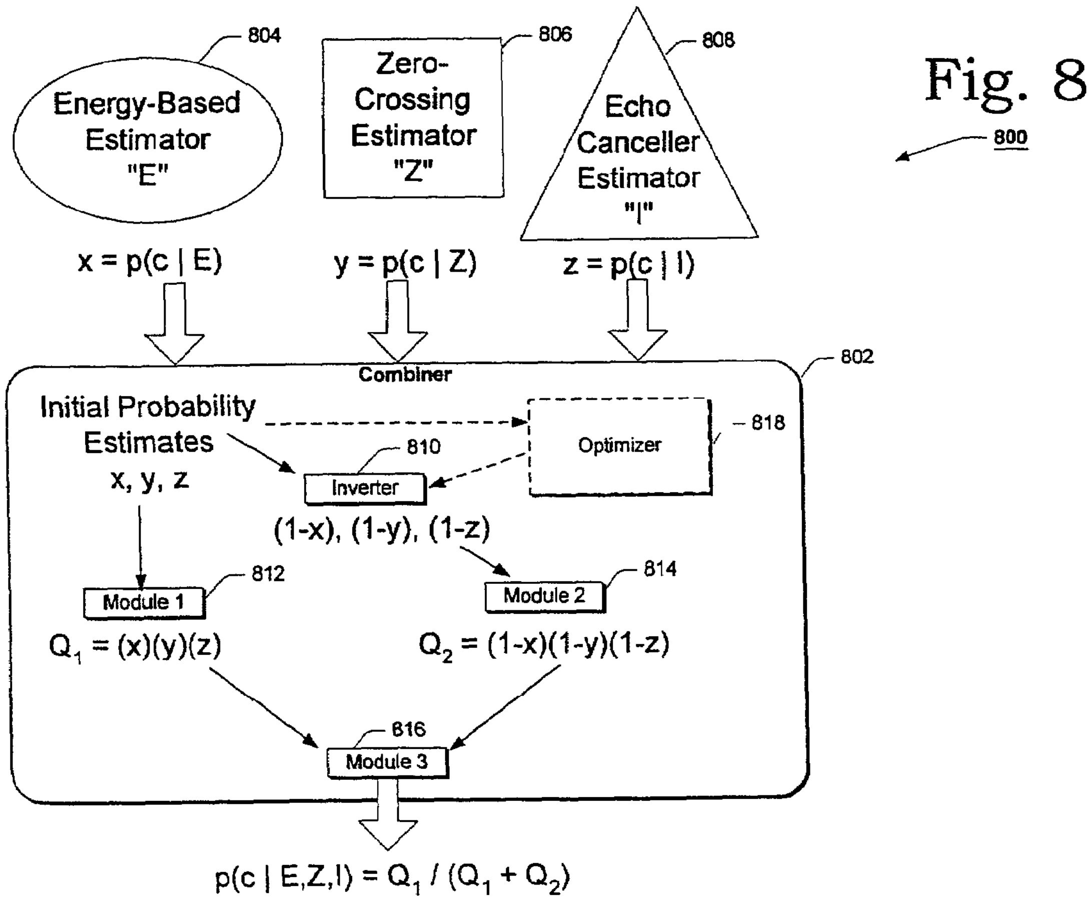
FIG. 8 is a block diagram of a voice activity detection apparatus of the present invention.

FIG. 8 shows one embodiment of the present invention, a VAD apparatus 800 that uses a probabilistic network having a combiner 802 that implements equation (2). The combiner receives input from three estimators: an energy-based unit (E) 804, a zero-crossing unit (Z) 806, and echo canceller information unit (I) 808. An energy-based unit (E) 804 may compute a probability of voice activity value p(c|E) from estimated energy level characteristics E of an input signal. A zero-crossing unit (Z) 806 may compute a probability of voice activity p(c|Z) from an estimated zero-crossing rate Z of the input signal. An echo canceller information unit (I) 808, if available, may compute a probability of voice activity p(c|I) based on information from an echo canceller that may use far-end voice activity, near-end voice activity, and/or convergence to discriminate between residual echo and genuine near-end voice activity intervals.

The combiner 802 combines initial probability values p(c|E), p(c|Z), and p(c|I) into an overall probability value p(c|E, Z, I) using equation (2). The entity p(c|E, Z, I) is the overall conditional probability of signal content "c" in light of initial probability values from units E 804, Z 806, and I 808. Although in other embodiments the combiner 802 can use a prior probability value in equation (2), the VAD combiner 802 illustrated in this embodiment assumes neutral prior probability, setting a prior probability value for use in general equation (2) to a value of 0.5 (50%). Neutral probabilities cancel out in general equation (2) resulting in simplified general equation (3):

$$p(c \mid x_1, \ldots, x_n) = \frac{\prod_{i=1}^{n} [p(c \mid xi)]}{\prod_{i=1}^{n} [p(c \mid xi)] + \prod_{i=1}^{n} [1 - p(c \mid xi)]}. \quad (3)$$

When initial probability values from the illustrated estimators E 804, Z 806, and I 808 are inserted into equation (3), the overall probability value, p(c|E, Z, I), is given by:

$$p(c \mid E, Z, I) = \frac{p(c \mid E) * p(c \mid Z) * p(c \mid I)}{p(c \mid E) * p(c \mid Z) * p(c \mid I) + (1 - p(c \mid E)) * (1 - p(c \mid Z)) * (1 - p(c \mid I))}. \quad (4)$$

In the illustrated embodiment of the VAD apparatus 800, an inverter 810 and a first module 812 each receive initial probability estimates from estimators E 804, Z 806, and I 808. The inverter 810 obtains initial inverse probability values (1−p(c|E)), (1−p(c|Z)), and (1−p(c|I)) from the initial probability values and passes the initial inverse probability values to a third module 814. Whereas an initial probability value is the probability that at least part of the signal represents content, an initial inverse probability value is the probability that no part of the signal represents content. Each initial inverse probability value may be obtained by subtracting each initial probability value, stated as a value between the integers 0 and 1 inclusive, from the integer 1.

The first module 812 obtains a first product $\Pi_1$ by multiplying together each initial probability value: $\Pi_1$=p(c|E)*p(c|Z)*p(c|I). The second module 814 obtains a second product $\Pi_2$ by multiplying together each initial inverse probability value: $\Pi_2$=(1−p(c|E))*(1−p(c|Z))*(1−p(c|I)). A third module 816 obtains an overall probability value by dividing the first product $\Pi_1$ by the sum of the first product $\Pi_1$ and the second product $\Pi_2$: p(c|E, Z, I)=$\Pi_1/(\Pi_1+\Pi_2)$.

In an example voice activity detection performed by the illustrated embodiment, the energy-based unit (E) 804 passes an initial probability value p(c|E) of 0.6 to the combiner 802, the zero-crossing unit (Z) 806 passes an initial probability value p(c|Z) of 0.7 to the combiner 802, and the echo canceller information unit (I) 808 passes an initial probability value p(c|I) of 0.4 to the combiner 802. The inverter 810 of the combiner 802 obtains initial inverse probability values corresponding to each initial probability value. For the energy-based unit 804, the initial inverse probability value (1−p(c|E))=0.4. For the zero-crossing unit 806, the initial inverse probability value (1−p(c|Z))=0.3. And for the echo canceller information unit 808, the initial inverse probability value (1−p(c|I))=0.6. The first module 812 multiplies each initial probability value together to obtain the first product: $\Pi_1$=p(c|E)*p(c|Z)*p(c|I)=.6*0.7*0.4=0.168. The second module 814 multiplies each initial inverse probability value together to obtain the second product: $\Pi_2$=(1−p(c|E))*(1−p(c|Z))*(1−p(c|I))=0.4*0.3*0.6=0.072. The third module 816 obtains an overall probability value representing the likelihood of voice activity in the signal by dividing the first product $\Pi_1$ by the sum of the first product $\Pi_1$ and the second product $\Pi_2$: p(c|E, Z, I)=$\Pi_1/(\Pi_1+\Pi_2)$=0.168/(0.168+0.072)=0.7. This overall probability value may be used in unlimited ways to detect whether voice activity is present, including comparing the overall probability value to a threshold value.

An optimizer 818 may be included in the combiner 802 or the network to conform the network to characteristics of a particular system or a particular signal being processed. An optimizer 818 is anything that improves the detection of content in a signal. An optimizer 812 may filter probability values from estimators or enable and/or disable estimators in order to optimize detection of content. The optimizer 812 could function, for example, by discarding aberrant initial probability values that deviate too far from the average of all the initial probability values. In other variations, an optimizer 812 could perform its own measurements of one or more attributes of the same signal being processed by estimators and optimize based on a comparison of inputs. In yet other variations, an optimizer 812 could be linked to an entity making use of the overall probability value and optimize content detection on the basis of final results. For example, the optimizer 812 could seek "clean" VAD results free of voice clipping and other errors by performing trial-and-error enabling and disabling of estimators. Depending on the run-time availability of the three illustrated voice activity estimators 804, 806, 808, the computational resources, and the framework within which VAD is used, some or all of the estimators may be enabled or limited by the optimizer 818. Since the estimators are combined into a network that can be adjusted and optimized in run-time to enable or disable voice activity estimators without restructuring the network, additional estimators may also be added by the optimizer and configured in run-time. The probabilistic network of the present invention makes the illustrated VAD apparatus 800 more tolerant of noise in the initial probability value estimates produces by the voice activity estimators.

Although the combiner 802 has been described in terms of "modules" to facilitate description, one or more circuits, components, registers, processors, software subroutines, or any combination thereof could be substituted for one, several, or all of the modules.

Figure 9:
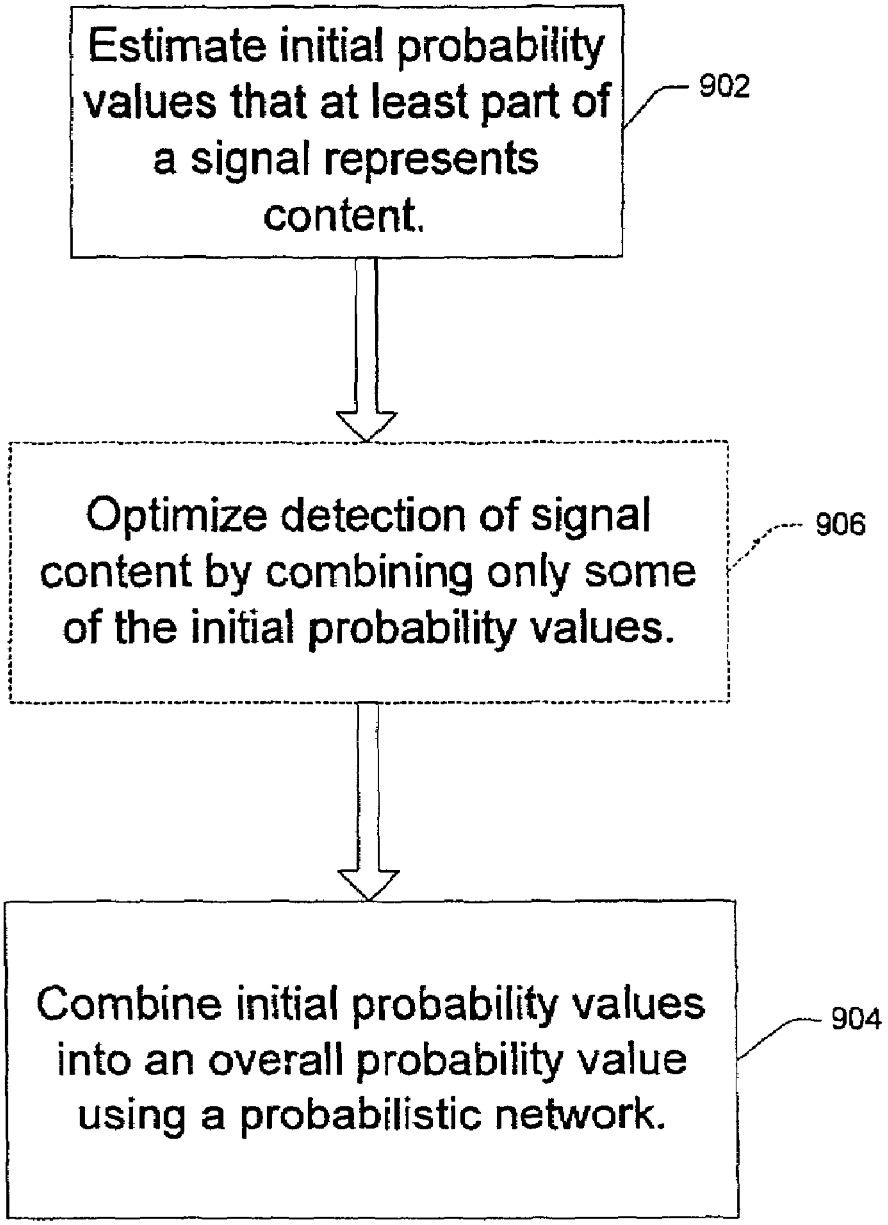
FIG. 9 is a flow diagram of a first method embodiment of the present invention.

FIG. 9 shows a first method embodiment of the present invention. Initial probability values representing the probability that at least part of a signal represents content are estimated 902, and the initial probability values are combined using a probabilistic network into an overall probability value representing an overall probability that at least part of the signal represents content 904. In some embodiments, the signal content may be tones or voice activity, such as speech, near end speech, and far end speech. As discussed, the content may also be pictures, facsimiles, and any other significant data, signal attribute, or signal characteristic. Estimating initial probability values may be obtained by measuring attributes of the signal or by any other means, such as using an estimator device. A plurality of estimators may be used to perform the estimating and some of the plurality may be enabled while some are disabled. In one embodiment, only initial probability values from enabled estimators are combined into an overall probability value. Optimizing detection of signal content by combining only some of the initial probability values or by enabling and/or disabling estimators may be included in the method 906.

Figure 10:
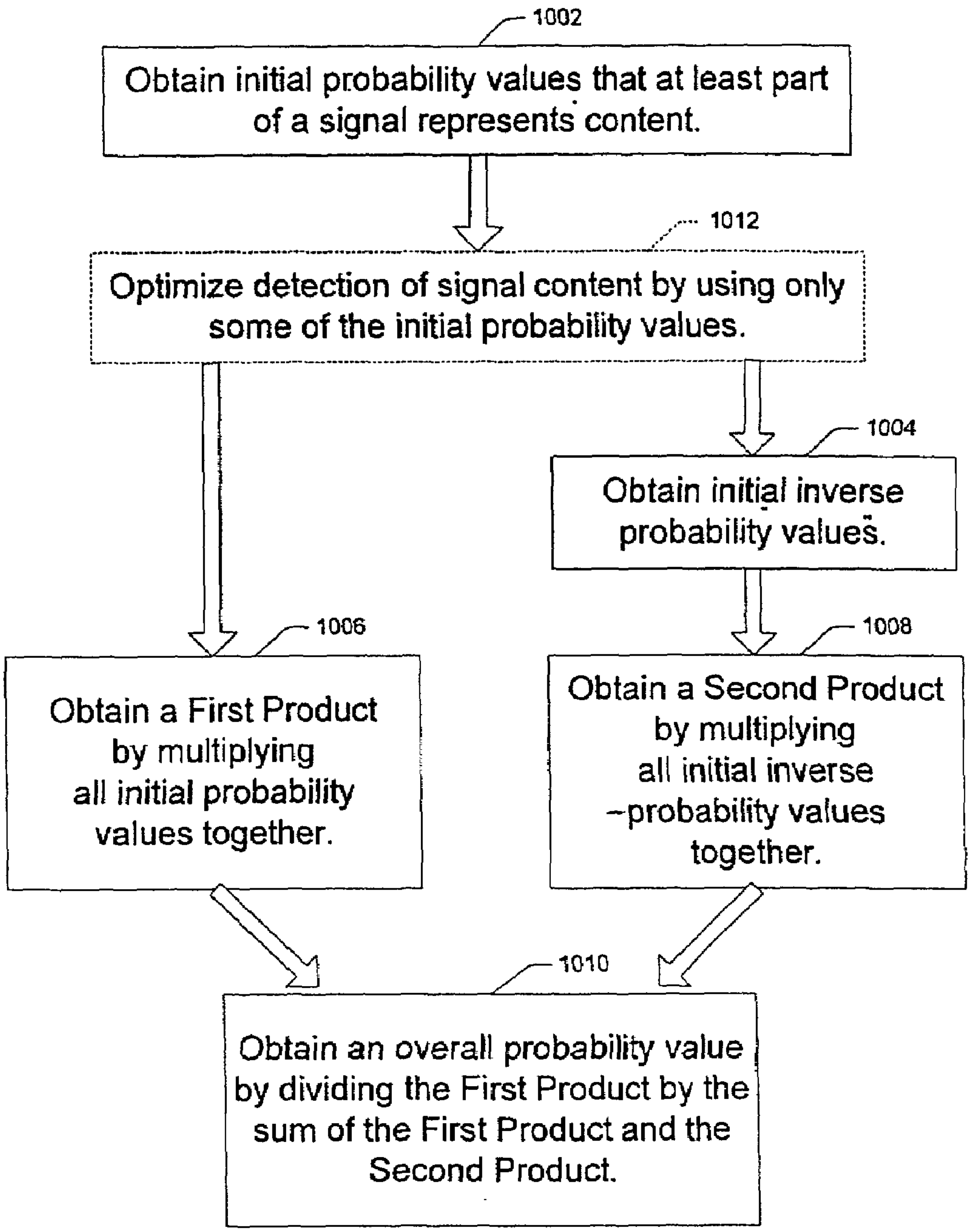
FIG. 10 is a flow diagram of a second method embodiment of the present invention.

FIG. 10 shows a second method embodiment of the present invention using a probabilistic network method. The probabilistic network may use a ratio of probabilities. Initial probability values are obtained 1002, each value representing a probability that at least part of the signal represents content. Inverse probability values are obtained from each corresponding initial probability value 1004. Each initial inverse probability value is the probability that no part of the signal represents content. A first product $\Pi_1$ is obtained by multiplying all initial probability values together 1006. A second product $\Pi_2$ is obtained by multiplying the initial inverse probability values together 1008. An overall probability value is obtained by dividing the first product $\Pi_1$ by the sum of the first product $\Pi_1$ and the second product $\Pi_2$ 1010. Optimizing detection of content by using only some of the initial probability values or by enabling and/or disabling estimators may be included in the method 1012.

Figure 11:
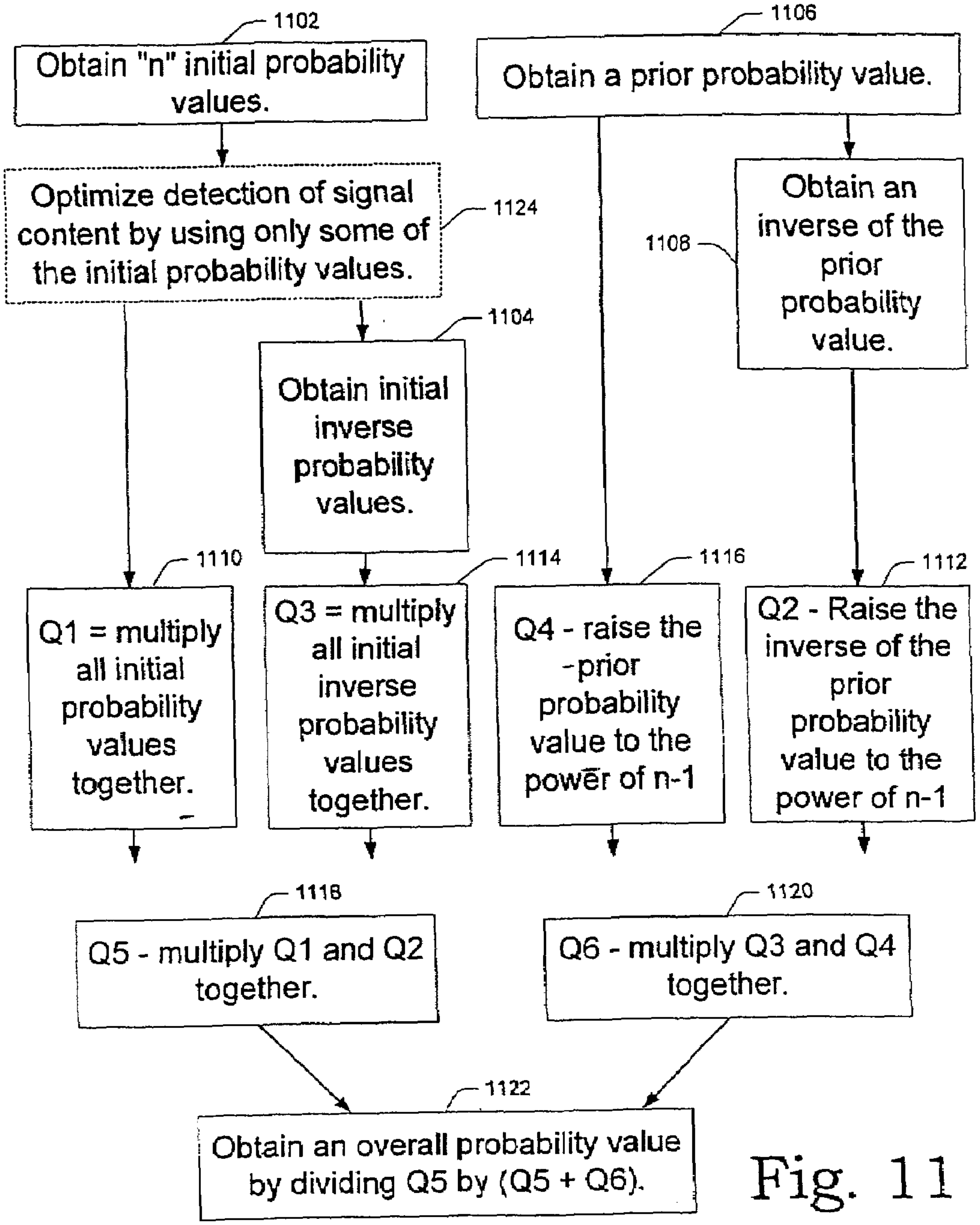
FIG. 11 is a flow diagram of a third method embodiment of the present invention.

FIG. 11 shows a third method embodiment of the present invention using a probability network method that includes at least one prior probability. A quantity "n" of initial probability values is obtained 1102 and initial inverse probability values are also obtained 1104. Each probability value is the probability that at least part of the signal represents content, and each inverse probability value comprises the probability that no part of the signal represents content. A prior probability value is obtained 1106 and an inverse of the prior probability value is also obtained or calculated 1108. The initial probability values are multiplied together to obtain a first quantity 1110. The prior inverse probability value is raised to an exponent comprising a number of initial probability values, such as the number of initial probability values n minus 1: (n−1) to yield a second quantity 1112. The initial inverse probability values are multiplied together to give a third quantity 1114. The prior probability value is raised to an exponent comprising a number of initial probability values, such as the number of initial probability values n minus 1: (n−1) to yield a fourth quantity 1116. The first quantity and the second quantity are multiplied together to give a fifth quantity 1118. The third and fourth quantities are multiplied together to give a sixth quantity 1120. A current overall probability value is obtained by dividing the fifth quantity by the sum of the fifth quantity and the sixth quantity 1122. Optimizing the detection of signal content by using only some of the initial probability values or by enabling and/or disabling estimators may be included in the method 1124.

Figure 12:
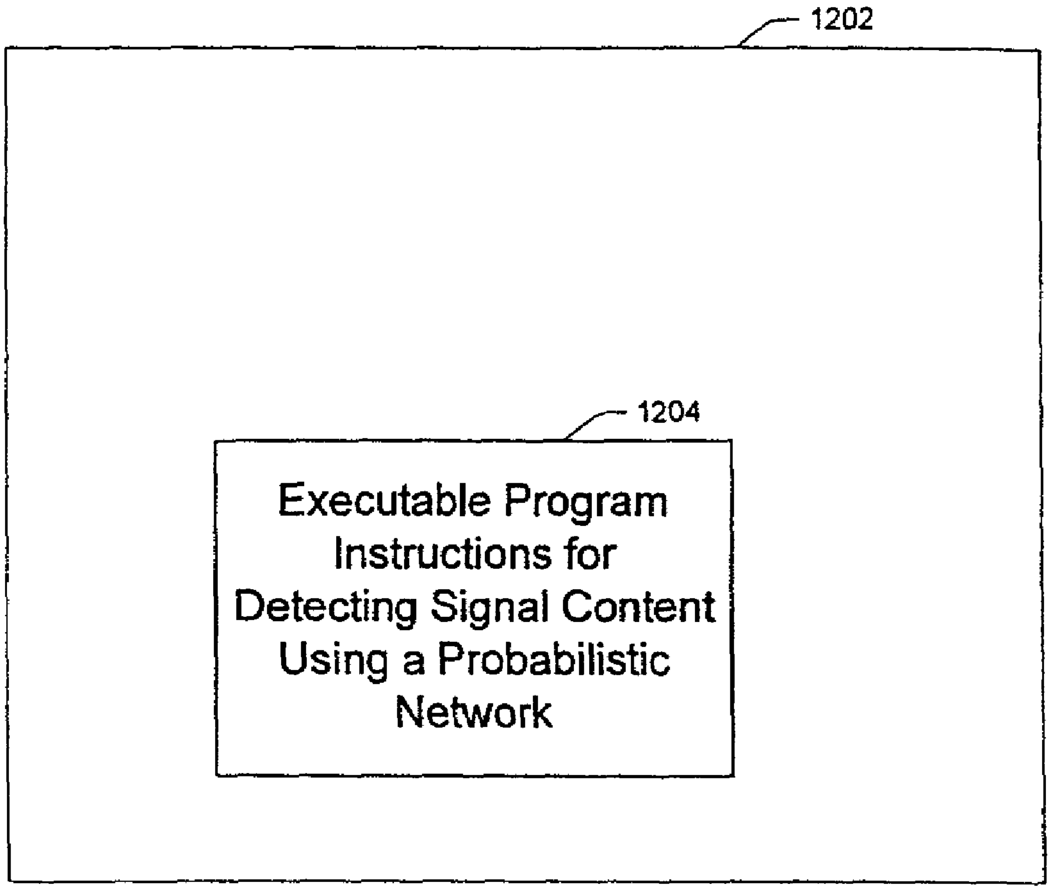
FIG. 12 is a graphical representation of a machine readable medium having instructions for executing one or more methods and/or apparatuses of the present invention.

FIG. 12 shows an apparatus comprising a machine-readable medium 1202 that provides instructions 1204, which cause a machine to estimate initial probability values that at least part of a signal represents content, and to combine each initial probability value into an overall probability value. The apparatus may further comprising instructions for estimating initial probability values based on measuring attributes of the signal, for example, by using one or more estimators. The instructions may enable and disable estimators or other probability estimating means in order to conform the apparatus to particular systems or signal characteristics. In some embodiments the instructions include using a probabilistic network to obtain an overall probability value. The probabilistic network may use a ratio of probabilities that may include at least one prior probability value. The instructions may also include instruction for obtaining for each initial probability value a corresponding initial inverse probability value, instructions for obtaining a first product by multiplying all initial probability values together, and instructions for obtaining a second product by multiplying the initial inverse probability values together, and obtaining an overall probability value by dividing the first product by the sum of the first product and the second product. The apparatus may further comprise instructions for enabling and/or disabling estimators or other probability estimating means to optimize detection of signal content.

The methods are described in their most basic forms but additions and deletions could be made without departing from the basic scope. It will be apparent to persons having ordinary skill in the art that many further modifications and adaptations can be made. The particular embodiments are not provided to limit the invention but to illustrate it. The scope of the present invention is not to be determined by the specific examples provided above but only by the claims below.

What is claimed is:

1. A method, comprising:

estimating probability values that at least part of a signal represents content, wherein the content is voice activity selected from a group consisting of a tone, speech, near-end voice activity, and far-end voice activity;

combining each probability value into an overall probability value using a probabilistic network that uses a ratio of probabilities;

estimating initial probability values;

obtaining initial inverse probability values;

obtaining a prior overall inverse probability value;

obtaining a first quantity comprising a product of initial probability values;

obtaining a second quantity comprising the prior overall inverse probability value raised to an exponent;

obtaining a third quantity comprising the product of all initial inverse probability values;

obtaining a fourth quantity comprising the prior overall probability value raised to an exponent; multiplying the first quantity by the second quantity to obtain a fifth quantity;

multiplying the third quantity by the fourth quantity to obtain a sixth quantity; and obtaining a current overall probability value by dividing the fifth quantity by the sum of the fifth quantity and the sixth quantity, the combining probability values into an overall probability value further comprising combining based at least in part upon at least one prior probability value.

2. The method of claim 1, wherein the content is data for data compression.

3. The method of claim 1, further comprising estimating probability values based on measuring at least one attribute of the signal.

4. The method of claim 1, wherein using a probabilistic network comprises dividing the product of probability values that at least part of the signal represents content by the sum obtained by adding the product of probability values that at least part of the signal represents content to a product of probability values that no part of the signal represents content.

5. The method of claim 1, further comprising using a probabilistic network.

6. The method of claim 1, wherein using a probabilistic network comprises dividing the product of probability values weighted by a prior probability factor by the sum obtained by adding the product of probability values weighted by a prior probability factor to the product of inverse probability values weighted by a prior probability factor.

7. The method of claim 1, wherein each probability value is the probability that at least part of the signal represents content, and each inverse probability value comprises the probability no part of the signal represents content.

8. The method of claim 1, wherein each inverse probability value is obtained by subtracting a corresponding probability value, stated as a value between 0 and 1 inclusive, from a value of 1.

9. The method of claim 1, the combining further comprising combining based at least in part on a prior overall probability value.

10. The method of claim 9, further comprising obtaining an overall probability value using a neutral prior overall probability value.

11. The method of claim 1, further comprising optimizing detection of content by combining probability values using a probabilistic network that selects the probability values to combine.

12. The method of claim 11, further comprising discarding probability values that deviate from a mean of all the probability values.

13. The method of claim 1, further comprising estimating probability values using at least one estimator.

14. The method of claim 13, further comprising measuring at least one attribute of the signal using multiple estimators wherein some estimators are enabled and other estimators are disabled.

15. The method of claim 14, wherein the combining each probability value into an overall probability value comprises combining probability values from enabled estimators.

16. The method of claim 1, further comprising: obtaining for each probability value a corresponding inverse probability value; obtaining a first product by multiplying all probability values together; obtaining a second product by multiplying the inverse probability values together; and obtaining an overall probability value by dividing the first product by the sum of the first product and the second product.

17. The method of claim 16, wherein each probability value is the probability that at least part of the signal represents content, and each inverse probability value is the probability that no part of the signal represents content.

18. The method of claim 16, wherein each inverse probability value is obtained by subtracting each probability value, stated as a value between 0 and 1 inclusive, from a value of 1.

19. The method of claim 1, further comprising using estimators to estimate probability values that at least part of a signal represents content, and enabling and/or disabling some of the estimators to optimize detection of content.

20. The method of claim 19, further comprising enabling and/or disabling one or more estimators based on the type of signal.

21. The method of claim 19, further comprising enabling and/or disabling one or more estimators based on the presence or absence of at least one signal characteristic.

22. An apparatus, comprising:

at least one estimator to estimate initial probability values that at least pan of a signal represents content, wherein the content is voice activity selected from the group consisting of a tone, speech, near end speech, and far end speech; and a combiner to combine each initial probability value into an overall probability value, the combiner further comprising one or more modules, the one or more modules: to obtain for each initial probability value a corresponding initial inverse probability value; to obtain a first product comprising a product of initial probability values multiplied together; to obtain a second product comprising a product of the initial inverse probability values multiplied together; and to obtain an overall probability value by dividing the first product by the sum of the first product and the second product.

23. The apparatus of claim 22, wherein the content is data for compression.

24. The apparatus of claim 22, the at least one estimator to estimate initial probability values by measuring attributes of the signal.

25. The apparatus of claim 22, further comprising a probabilistic network.

26. The apparatus of claim 22, wherein each initial probability value is the probability that at least part of the signal represents content, and each initial inverse probability value is the probability that no part of the signal represents content.

27. The apparatus of claim 22, wherein each initial inverse probability value is obtained by subtracting each initial probability value, stated as a value between 0 and 1 inclusive, from a value of 1.

28. The apparatus of claim 22, the at least one estimator further comprising a plurality of estimators wherein some estimators are enabled and other estimators are disabled.

29. The apparatus of claim 28, the combiner to combine only initial probability values from enabled estimators.

30. The apparatus of claim 22, the combiner to combine each initial probability value into an overall probability value for a current time interval based at least in part upon at least one prior probability value.

31. The apparatus of claim 30, wherein the at least one prior probability value is a prior overall probability value.

32. The apparatus of claim 31, wherein a value of neutral probability value is used for the prior overall probability value.

33. The apparatus of claim 22, further comprising an optimizer to optimize detection of content.

34. The apparatus of claim 33, the optimizer to detect content by combining probability values using a probabilistic network that can select the probability values to combine.

35. The apparatus of claim 34, the optimizer to discard probability values that deviate from a mean of all the probability values.

36. The apparatus of claim 33, the optimizer to enable and/or disable some of the estimators to optimize detection of content.

37. The apparatus of claim 36, the optimizer to enable and/or disable one or more estimators based on the type of signal.

38. The apparatus of claim 36, the optimizer to enable and/or disable one or more estimators based on the presence or absence of at least one signal characteristic.

39. A voice activity detector, comprising:

at least one voice activity estimator to estimate initial probability values that at least part of a signal represents voice activity, wherein the voice activity is selected from a group consisting of a tone, speech, near-end speech, and far-end speech; and a combiner to combine each initial probability value into an overall probability value, the combiner further comprising one or more modules, the modules: to obtain for each initial probability value a corresponding initial inverse probability value; to obtain a first product comprising a product of initial probability values multiplied together; to obtain a second product comprising a product of the initial inverse probability values multiplied together; and to obtain an overall probability value by dividing the first product by the sum of the first product and the second product.

40. The voice activity detector of claim 39, wherein at least one voice activity detector is selected from a group consisting of an energy-based voice activity estimator, a zero-crossing voice activity estimator, and an echo canceller voice activity estimator.

41. The voice activity detector of claim 39, the at least one voice activity estimator to estimate initial probability values by measuring attributes of the signal.

42. The voice activity detector of claim 39, further comprising a probabilistic network.

43. The voice activity detector of claim 39, the at least one voice activity estimator further comprising a plurality of estimators wherein some estimators are enabled and other estimators are disabled.

44. The voice activity detector of claim 43, the combiner to combine only initial probability values from enabled estimators.

45. The voice activity detector of claim 39, the combiner to combine each initial probability value into an overall probability value for a current time interval based at least in part upon at least one prior probability value.

46. The voice activity detector of claim 45, wherein the at least one prior probability value is a prior overall probability value.

47. The voice activity detector of claim 46, wherein a value of neutral probability value is used for the prior overall probability value.

48. The voice activity detector of claim 39, further comprising an optimizer to improve detection of voice activity.

49. The voice activity detector of claim 48, the optimizer to detect voice activity by combining probability values using a probabilistic network that can select the probability values to combine.

50. The voice activity detector of claim 49, the optimizer to discard probability values that deviate from a mean of all the probability values.

51. The voice activity detector of claim 48, the optimizer to enable and/or disable some of the voice activity estimators to optimize detection of voice activity.

52. The voice activity detector of claim 51, the optimizer to enable and/or disable one or more voice activity estimators based on the type of signal.

53. The voice activity detector of claim 51, the optimizer to enable and/or disable one or more voice activity estimators based on the presence or absence of at least one signal characteristic.

54. The voice activity detector of claim 51, the optimizer to enable and/or disable one or more voice activity estimators by trial-and-error to achieve optimum voice activity detection.

* * * * *

UNITED STATES PATENT AND TRADEMARK OFFICE

CERTIFICATE OF CORRECTION

PATENT NO. : 7,136,813 B2
APPLICATION NO. : 09/963177
DATED : November 14, 2006
INVENTOR(S) : Likhachev et al.

It is certified that error appears in the above-identified patent and that said Letters Patent is hereby corrected as shown below:

In column 12, at line 40, delete “pan”, insert --part--.

Signed and Sealed this

Fourth Day of September, 2007

JON W. DUDAS
*Director of the United States Patent and Trademark Office*